United States Patent [19]

Feinberg

[11] 3,960,684

[45] June 1, 1976

[54] SULFONES AS SOLVENTS IN CATALYSTS OF U.V. CURABLE SYSTEMS

[75] Inventor: Jacob Howard Feinberg, Hightstown, N.J.

[73] Assignee: American Can Company, Greenwich, Conn.

[22] Filed: Sept. 30, 1974

[21] Appl. No.: 510,176

Related U.S. Application Data

[62] Division of Ser. No. 355,882, April 30, 1973, abandoned.

[52] U.S. Cl. .............................. 204/159.11; 96/75; 96/91 R; 96/115 P; 204/159.14; 204/159.15; 252/426; 252/429 R; 260/2 A; 260/2 EP; 260/2 XA; 260/2 BP; 260/30.2; 260/30.8 R; 260/47 EP; 260/830 TW; 260/837 R; 427/44
[51] Int. Cl.$^2$ ...................... B01J 1/10; C08G 51/46
[58] Field of Search ........................ 252/426, 429 R; 96/91 R; 204/159.11, 15; 260/2 EP, 47 EP, 830 TW, 837, 30.2, 30.8 R

[56] References Cited
UNITED STATES PATENTS

| | | | |
|---|---|---|---|
| 3,544,317 | 12/1970 | Yonezawa | 96/91 R X |
| 3,615,485 | 10/1971 | Islam et al. | 96/91 R X |
| 3,708,296 | 1/1973 | Schlesinger | 96/33 |
| 3,829,359 | 8/1974 | Feinberg | 260/47 EP X |

OTHER PUBLICATIONS

The Condensed Chemical Dictionary, 8th ed., 1971, pub. by V. N. Reinhold Co., N.Y., N.Y., p. 835.

*Primary Examiner*—Murray Tillman
*Assistant Examiner*—T. Pertilla
*Attorney, Agent, or Firm*—Robert P. Auber; Ernestine C. Bartlett; George P. Ziehmer

[57] ABSTRACT

Stable diazonium catalyst solutions are provided in which the catalyst is dissolved in an organic sulfone. The catalyst solutions have greatly extended shelf-life while at the same time retain the ability to rapidly cure epoxy resins upon exposure to an energy source.

Polymerizable compositions of the two-package type, comprising polymerizable epoxy materials and such catalyst solutions are also provided.

13 Claims, No Drawings

SULFONES AS SOLVENTS IN CATALYSTS OF U.V. CURABLE SYSTEMS

This is a division of application Ser. No. 355,882, filed Apr. 30, 1973 now abandoned.

BACKGROUND OF THE INVENTION

In U.S. Pat. No. 3,708,296 issued Jan. 2, 1973 entitled Photopolymerization of Epoxy Monomers," and commonly assigned herewith, there are disclosed and claimed novel compositions comprising various epoxy materials and certain latent catalyst precursors therefor. U.S. Pat. Nos. 3,721,616 and 3,721,617 issued Mar. 20, 1973 as well as U.S. Pat. Nos. 3,711,390 and 3,711,391 issued Jan. 16, 1973 disclose similar compositions comprising gelation inhibitors as well. Such compositions are photosensitive and when exposed to an energy source such as actinic radiation, yield epoxy polymers which are receptive to ink and possess inherent toughness, abrasion resistance, adherence to metal surfaces, resistance to chemical attack, etc. and are thus valuable for many applications, particularly those involving formation of acid and alkali resist images for chemical milling, gravure images, offset plates, stencil making, etc.

Many of the polymerizable compositions proposed in the patents referred to hereinabove are essentially solventless wherein the catalyst can be directly dissolved into the liquid epoxide and use of a solvent is not a critical consideration in these cases. However, in a commercial operation where large quantities may be involved and where highly viscous materials may be involved, the dissolution process, in the absence of solvents, is time-consuming. Additionally, a considerable volume of air may become entrapped in the formulation during the dissolution and, where the system is pigmented, it is often difficult, if not impossible, to determine the point at which all of the catalyst has gone into solution. Thus, solvents are often necessary components of such polymerizable compositions.

In practice such photopolymerizable compositions have been utilized as a three-package system, e.g. the epoxide, diazonium catalyst, and solvent with or without a stabilizer have each been supplied separately and combined just prior to use. The three-package system has been necessary for two reasons: In some instances, the shelf-life of catalyzed epoxy formulation has not been great enough to allow for greatly extended periods of time between catalyzing the formulation and using it for the end purpose, and secondly, there has not been available a solvent which possessed adequate dissolving power for the diazonium catalyst yet was sufficiently inert thereto so that a catalyst solution could be prepared and stored for several months for subsequent use without significant loss of curing ability or introduction of gross amounts of color to the cured film. Acetonitrile has been found to be a potentially attractive material for use in such a two-package system because not only is it an excellent solvent for the diazonium catalysts, but in addition it gives greatly extended shelf-life to the catalyzed epoxy formulation. Unfortunately, acetonitrile has two major disadvantages: it is a highly toxic material and it is a very volatile material. Thus, because of the potential hazards involved in its use, it has not provided the solution to the problem. Accordingly, there is a need in the art for a solvent for diazonium catalysts which is substantially inert to the catalyst yet has adequate dissolving power therefor, is low in volatility, is low in toxicity and is readily available.

SUMMARY OF THE INVENTION

This invention is directed to the use of organic sulfones as solvents for diazonium catalysts and to two-package polymerizable compositions comprising such solvents.

DETAILED DESCRIPTION OF THE INVENTION

It has now been discovered that organic sulfones are especially good solvents for diazonium catalysts possessing all of the advantages above enumerated. In addition, solutions of such catalysts in sulfones have been found to be stable for greatly extended periods while retaining the ability to rapidly cure epoxides after such periods of storage.

It will be understood that the sulfone solutions of diazonium catalysts disclosed herein may be utilized for any of the purposes where a diazonium salt of a complex halogenide are normally employed. For purposes of illustration of a preferred embodiment of this invention, the solutions are described herein in general as components of a two-package system wherein the diazonium salt is employed to catalyze photopolymerization of a polymerizable material.

Any sulfone in which diazonium complex catalysts are soluble and with which such catalysts are compatible in the sense of substantial freedom from mutual chemical attach during storage may be utilized in the present invention. Notable as sulfone compounds which may conveniently be used are sulfones such as dimethyl sulfone,

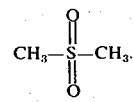

Additional examples are: dipropyl sulfone, ethylmethyl sulfone; alkyl aryl sulfones, diaryl sulfones and sulfones with numerous other substituents such as alkaryl and aralkyl groups may be utilized as represented by, for example, diphenyl sulfone, methyl phenyl sulfone (methyl sulfonyl benzene), etc.

Sulfones in which the sulphur atom is part of a stable heterocyclic ring are especially effective and preferred herein. Such compounds are preferably tetrahydrothiophene-1,1-dioxides of the formula

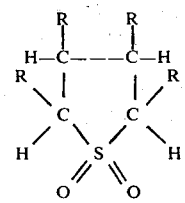

wherein R is an alkyl radical, preferably alkyl containing 1 to 12 carbon atoms, or hydrogen.

Exemplary sulfones within the purview of the above formula include:
Tetrahydrothiophene-1,1-dioxide (also known as sulfolane)
2-methyltetrahydrothiophene-1,1-dioxide 2,3-dimethyltetrahydrothiophene-1,1-dioxide
2,3,4,5-tetramethyltetrahydrothiophene-1,1-dioxide
3-ethyltetrahydrothiophene-1,1-dioxide
3,5-diethyltetrahydrothiophene-1,1-dioxide
2-methyl-4-tert-butyltetrahydrothiophene-1,1-dioxide
2,3-di-n-heptyltetrahydrothiophene-1,1-dioxide
3,4-di-n-dodecyltetrahydrothiophene-1,1-dioxide
3-n-propyl-4(3,3-dimethylbutyl)tetrahydrothiophene1,1-dioxide
3(3,3-diethylamyl)tetrahydrothiophene-1,1-dioxide,
etc. Mixtures of such compounds may likewise be employed. Tetrahydrothiophene-1,1-dioxide or sulfolane is especially preferred as the solvent herein.

Thus a great variety of sulfone compounds may be utilized as solvents in the compositions of the invention, provided only that the substituents on the sulfonyl,

group form a compound therewith which is substantially inert to the polymerizable material of the two-package system and to the catalyst precursor, these being the components which provide the desired end properties of the polymerizable composition as utilized in the polymerizable process of the invention and also provided that the compounds possess sufficient dissolving power to effect dissolution of the catalyst.

The two-package polymerizable compositions of the invention comprise, as the first component or package, a monomeric or prepolymeric epoxide or mixtures thereof and, as a second component, an aromatic diazonium catalyst dissolved in an organic sulfone.

Any monomeric or prepolymeric material, or mixture of such materials, of suitable viscosity or suitable miscibility in solvents, which is polymerizable to higher molecular weights through the action of a cationic catalyst, may be utilized in the process and compositions of the present invention. In a preferred embodiment, any polymerizable, monomeric or prepolymeric epoxide material or mixture of such epoxide materials, of suitable viscosity alone or when dissolved in a suitable solvent, may be utilized. The classic epoxy resin is obtained by the well known reaction of epichlorohydrin and bisphenol A (4,4'-isopropylidenediphenol). The reaction product is believed to have the form of a polyglycidyl ether of bisphenol A (the glycidyl group being more formally referred to as the 2,3-epoxypropyl group). The structure usually assigned to the resinous product is a viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A (n=O), which may be named 2,2-bis[p-(2,3-epoxypropoxy)phenyl]propane, and smaller proportions of polymers in which n is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis acid halide released when energy is applied to the latent polymerization catalyst.

Many other epoxide materials are available in polymerizable monomeric or prepolymeric forms and are suitable for use herein. Specific examples and listings of such epoxides applicable herein are as disclosed in U.S. Pat. Nos. 3,708,296; 3,721,616; 3,721,617; 3,711,390 and 3,711,391 referred to herein above, such disclosures being incorporated herein by these references thereto.

Lactones tend to be readily polymerizable under the action of a cationic catalyst such as a Lewis acid. Lactone monomers suitable for admixture in the compositions of the invention may be any lactone which is polymerizable to higher molecular weights through the action of cationic catalysts. Such lactones are described and claimed in co-pending U.S. application Ser. No. 292,759, filed Sept. 27, 1972, entitled "Photopolymerization of Lactones" now abandoned, as well as in Ser. No. 436,156 filed Jan. 1, 1974 and Ser. No. 585,573 filed June 10, 1975 and commonly assigned herewith. Lactones preferred for use in the instant compositions are cyclic esters, derived from hydroxy acids and represented by the general formula:

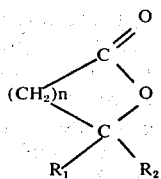

wherein $R_1$ and $R_2$ is hydrogen or alkyl, preferably lower alkyl containing 1 to 6 carbon atoms and n, the number of methylene groups is an integer of 1-13. Such cyclic esters are derived from hydroxy acids containing between 3 to 15 carbon atoms including the beta, gamma, delta and epsilon forms of propiolactone, butyrolactone, caprolactone, pivalolactone, valerolactone, octanoic lactone, pentadecyclic lactone, etc. Especially preferred are B-propiolactone and gammabutyrolactone. Many of such compounds are readily available commercially or their preparation is readily

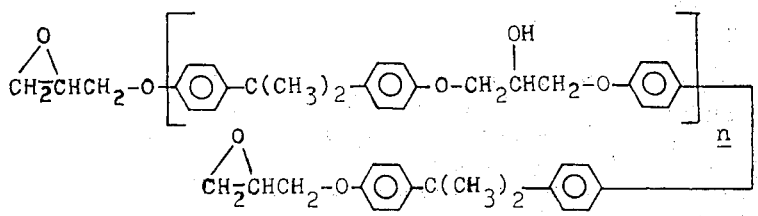

had by methods known in the art, for example, by intramolecular conversion of the corresponding hydroxy acid effected by heating.

Various ethylenically unsaturated materials are likewise suitable for admixture in the present invention. The preferred compounds are vinyl compounds, containing a polymerizable

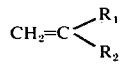

group wherein $R_1$ and $R_2$ may be hydrogen, aryl, alkyl, alkoxy, aryloxy, carbazolyl, etc. Such compounds include styrene, alkyl and halo-substituted styrenes such as $\alpha$-methyl styrene, $\alpha$-chlorostyrene, ethyl styrene; o, m and p-alkyl styrenes such as 2,4dimethyl styrene, meta-propyl styrene, dichlorostyrene, bromostyrene, etc.; vinyl ethers such as isobutyl vinyl ether, cetyl vinyl ether, vinyl methyl ether, vinyl ethyl ether, dodecyl vinyl ether, vinyl 2-chloroethyl ether, vinyl 2-ethylhexyl ether, vinyl isopropyl ether, vinyl decyl ether, vinyl 2-ethoxyethyl ether, vinyl methoxymethyl ether, vinyl benzyl ether, vinyl 3-phenylpropyl ether, vinyl 1-cyclohexyl ethyl ether, vinyl phenyl ether, etc.; vinyl carbazoles such as N-vinyl carbazole, etc.

Such polymerizable monomer mixtures will usually contain a predominant proportion of epoxide material. In general, such mixtures will contain from about 0.25 to 98, preferably 10 to 50 parts epoxide per part of lactone or vinyl monomer.

The materials utilized as latent polymerization initiators in the process and compositions of the present invention are radiation-sensitive catalyst precursors which decompose to provide a Lewis acid upon application of energy as likewise disclosed in U.S. Pat. Nos. 3,708,296; 3,721,616; 3,721,617; 3,711,390 and 3,711,391 which disclosure is additionally incorporated herein by reference.

The preferred photosensitive Lewis acid catalyst precursors are aromatic diazonium salts of complex halogenides, which decompose upon application of energy to release a halide Lewis acid. The aromatic diazonium cation may be represented generally as $[AR-N^+ \equiv N]$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $[MX_{n+m}]^{-m}$. Thus, the photosensitive salt and its decomposition upon actinic irradiation may be depicted as follows:

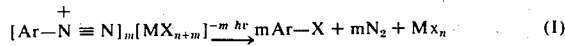

(1)

where X is the halogen ligand of the complex halogenide, M is the metallic or metalloid central atom thereof, $m$ is the net charge on the complex halogenide ion, and $n$ is the number of halogen atoms in the halide Lewis acid compound released. The Lewis acid halide $MX_n$ is an electron pair acceptor, such as $FeCl_3$, $SnCl_4$, $PF_5$, $AsF_5$, $BiCl_3$, $SbF_5$ and $BF_3$, etc. which upon suitable irradiation of the diazonium complex salt is released in substantial quantities and initiates or catalyzes the polymerization process, wherein the monomeric or prepolymeric material is polymerized, crosslinked and interacted as the result of the actinic irradiation.

The diazonium compounds of the present invention may be prepared using procedures known in the art, as disclosed in U.S. Pat. No. 3,708,296 issued Jan. 2, 1972 to S. Schlesinger and commonly assigned herewith and such preparation forms no part of the present invention.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
o-nitrobenzenediazonium
p-nitrobenzenediazonium
4-nitro-o-toluenediazonium(2-methyl-4-nitrobenzenediazonium)
6-nitro-2,4-xylenediazonium(2,4-dimethyl-6-nitrobenzenediazonium)
2-chloro-4-(dimethylamino)-5-methoxybenzenediazonium
4-chloro-2,5-dimethoxybenzenediazonium
2,4′,5-triethoxy-4-biphenyldiazonium(2,5-diethoxy-4-(p-ethoxyphenyl)benzenediazonium)
2,5-dimethoxy-4′-methyl-4-biphenyldiazonium(2,5-dimethoxy-4-(p-tolyl)benzenediazonium)
2,5-diethoxy-4-(phenylthio)benzenediazonium
2,5-diethoxy-4-(p-tolylthio)benzenediazonium
4-methoxybenzenediazonium
p-morpholinobenzenediazonium
2,5-dichloro-4-morpholinobenzenediazonium
2,5-dimethoxy-4-morpholinobenzenediazonium
4-(dimethylamino)-naphthalenediazonium Illustrative of the complex halogenide anions comprised in the photosensitive catalyst salts utilized in accordance with the present invention are the following:

tetrachloroferrate(III), $FeCl_4^-$
hexachlorostannate (IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
pentachlorobismuthate(III), $BiCl_5^{2-}$
hexachloroantimonate(V), $SbCl_6^-$ A selection of aromatic diazonium salts of complex halogenides is listed in Table I of U.S. Pat. No. 3,721,617 referred to hereinabove, such disclosure being incorporated herein by the aforegoing reference.

Anhydrous sulfolane as well as various of the other compounds listed herein above are solids at normal room temperature. By warming such compounds slightly above room temperature and using them within a few minutes it is possible to use such compounds with only minor inconvenience. However, this procedure may be avoided completely by employing from about 1 to 4% of a relatively inert solvent which has the effect of lowering the freezing point of the compound below room temperature thus providing 99 to 96% sulfone compound in liquid form. Solid sulfones may be used for this purpose if desired. Solvents suitable for this use include propylene carbonate, toluene, xylene, monochlorobenzene, trichloroethylene, methylene chloride, sucrose acetate isobutyrate, water, etc. Preferably, the total amounts of solvents employed in the two-package compositions of the invention, particularly in those applications where essentially solventless compositions are desired, including both auxialLary solvents and sulfones should be kept below 4% by weight. However, where some of the sulfones listed are high melting solids, e.g. above 40°C, such compounds may be admixed with liquid sulfones or solvents listed hereinabove which may also function to maintain such compounds in liquid form for use herein.

Referring to equation I hereinabove showing the photolytic decomposition of the catalyst precursor, the halide Lewis acid $MX_n$ released reacts with the epoxide or other polymerizable material with a result exemplified by the following:

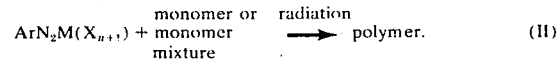

$$ArN_2M(X_{n+1}) + \text{monomer or monomer mixture} \xrightarrow{\text{radiation}} \text{polymer.} \qquad (II)$$

The cationic catalyst is believed to act by cleaving a carbon-oxygen epoxy or lactone bond, or by opening the double bond in a vinyl(ethylenic) monomer, initiating growth of a polymeric chain or permitting formation of a cross-linkage. A general application of the process embodied by equations I and II can be as follows: a diazonium complex salt, for example, as identified hereinabove, is admixed, with a solvent, comprising a sulfone. In this form, the catalyst solution may be stored and/or shipped until its use is desired. In a preferred embodiment, the fluid composition may be admixed with an epoxy monomer or epoxy monomer in admixture with a lactone or vinyl monomer with or without a gelation inhibitor. The mixture is thereafter coated on a suitable substrate such as a metal plate, plastic, or paper, and the substrate is exposed to ultraviolet, or electron beam radiation. On exposure the diazonium compound decomposes to yield the Lewis acid catalyst, which initiates the polymerization of the epoxy monomer or mixture of monomers. The resulting polymer is resistant to most solvents and chemicals.

The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficent absorbtion of energy to excite the desired decomposition.

It may be desirable to include in the two-package compositions gelation inhibitors such as those disclosed in U.S. Pat. Nos. 3,721,616; 3,721,617; 3,711,390 and 3,711,391 referred to above. Such stabilizers when present are preferably added to the expoxide component of the two-package system.

The following examples will serve to further illustrate the invention.

EXAMPLES 1A - 1D

Several large batches were prepared by mixing together the following epoxides in the indicated proportions:

| Epoxide | Epoxy Equiv. Wt. | 25°C. Viscosity, Cps. | Parts by Weight |
|---|---|---|---|
| (1) Diglycidyl ether of bisphenol A | 172–178 | 4000–6000 | 55 |
| (2) (3,4-epoxycyclohexyl)-methyl 3,4-epoxycyclohexanecarboxylate | 131–143 | 350–450 | 30 |
| (3) Alkyl glycidyl ether in which alkyl groups are predominantly dodecyl and tetradecyl | 286 | 8.5 | 15 |

A number of [aliquot] samples were withdrawn from these and employed in the examples which follow in which parts are by weight and temperature in degrees Centigrade unless indicated otherwise.

Samples were coated on paperboard, using a drawbar to provide a coating of the order of about 0.0003 inch thick, when dry, after which they were exposed to a mercury vapor lamp at a distance of 2 inches unless otherwise indicated. The relative rates of cure were determined by noting the exposure time which was necessary to produce a finish which was hard to the touch. These cure rates were compared to the rate of cure of a freshly catalyzed resin mixture utilizing a freshly prepared solution of catalyst and having a cure rate of 1.0. A value less than 1.0 denotes a slower rate of cure than that of the freshly catalyzed formulation on a scale of 1.0 to 0.0.

1A

A catalyst solution was prepared by adding 1 part p-methoxybenzene diazonium hexafluorophosphate to 2 parts of a solvent containing 98% sulfolane and 2% propylene carbonate.

The solution was stored for 12½ months after which a 0.3g. aliquot was added to 10g. of the epoxide blend set forth above. The catalyzed epoxy formulation was light yellow in color, had an initial viscosity of 376 cps. at 25°C and was found to cure at the same rate expected of a freshly prepared catalyst solution.

After standing for 24 hours, the formulation was found to have a viscosity of 432 cps. at 25°.

1B

A catalyst solution was prepared by adding 3.53g. p-methoxybenzene diazonium hexafluorophosphate to 7.06g. dimethyl sulfolane and 2.0g. sulfolane.

The solution was stored for 10½ months after which a 0.3g. aliquot was added to 10g. of the epoxide blend of lA. The initial viscosity of the catalyzed formulation was found to be 371 cps. at 25°C. The formulation was light yellow in color. After standing for 24 hours, the viscosity was found to be 431 cps. at 25°. The cure rate relative to that of a freshly prepared sample was found to be 0.9 when measured in the same manner under the same conditions.

IC

A yellow catalyst solution was prepared by adding 5.0g p-chlorobenzenediazonium hexafluorophosphate to 10.0g sulfolane containing 3% water. After storage for 1 week, the catalyst solution was still yellow in color, a result that is quite unusual since solutions of the catalyst in other solvents for example, propylene carbonate were found to turn dark in less than 24 hours.

1.5g of the aged solution was employed to catalyze 50.0g of an epoxide blend described in IA but containing 20 parts epoxide (1), 10 parts of epoxide (2) and 3 parts epoxide (3). The catalyzed formulation was light yellow in color and was found to cure to a hard finish after about 1 second exposure to a 360 Watt medium pressure mercury arc.

The above catalyst solution after aging for three weeks was found to be reddish brown in color but was still clear with no sediment present. When 1.5g of this aged solution was added to 50.0g of the epoxide blend, the catalyzed formulation was yellow-orange in color and was found to cure to a hard finish after a 1 to 1½ second exposure to a 360 Watt medium pressure mercury arc at a distance of 2 inches.

ID 10.0g. samples of polymerizable resin mixtures were prepared as follows:
a. 10.0g. of the epoxide blend of IA
b. 9.0g. of the epoxide blend of IA and 1.0g. gammabutyrolactone
c. 9.5g. of the epoxide blend of IA and 0.5g. dodecyl vinyl ether To each of the above compositions was added 0.3g. of a 10½ month aged catalyst solution prepared by mixing a 6.0g. aliquot containing 3.53g. p-methoxybenzene diazonium hexafluorophosphate, 7.06g. dimethyl sulfolane and 2.0g. sulfolane with 0.04g. of a solution containing 95 parts sulfolane and 5 parts of a substituted poly (vinylpyrrolidone) available commercially as Ganex V-816.

Each of the three catalyzed compositions (a), (b) and (c) were found to be yellow in color and were found to cure at the same rate as the same compositions catalyzed with freshly prepared catalyst solutions.

After standing overnight, these three compositions were found to still be fluid and yellow in color.

It will be apparent from the results of Examples IA to ID catalyst solutions of the invention have greatly extended storability and yet retain the ability to effect rapid cure of the catalyzed formulation upon exposure to an energy source since the aged solutions cure at substantially the same rate as the freshly prepared catalyst solutions. Moreover, the solvent is compatible with the polymerizable material, e.g. epoxide, as shown by the Examples in which the aged epoxy-catalyst solutions were still fluid after 24 hours.

EXAMPLE 2

To illustrate the superiority of the sulfones of this invention as a solvent, various solvents were compared using the following procedure:

1 part p-methoxybenzenediazoniumhexafluorophosphate was dissolved in 2 parts solvent and the resulting solution was then stirred into 100 parts of the epoxy blend of Example 1.

The catalyzed compositions were then stored at 40°C and their viscosities measured periodically using a Brookfield Viscometer. The results were as follows:

| Solvent | % Increase in Viscosity After 3 Days (at 40°C) | Fluid After 7 Days |
|---|---|---|
| Propylene Carbonate | 340% | No |
| 2% propylene carbonate in sulfolane | 198% | Yes |
| Acetonitrile | 101% | Yes |
| Sulfolane | 195% | Yes |

As can be seen, the sulfone solvent of this invention is inert when compared to propylene carbonate and other solvents.

EXAMPLE 3

The following solutions were prepared and aliquots were tested after aging for about 4½ months. Each of the solutions were formulated to contain anhydrous sulfolane, p-methoxybenzene diazonium hexafluorophosphate and solvent to determine compatibility and inertness of the solvent and to the effectiveness of the particular solvent in maintaining sulfolane in the liquid state at room temperature and what effect the same would exert on the ability of the solution to catalyze an epoxy formulation after aging. The solvents and results are reported in the Table which follows.

In the table, the viscosity was determined at 25°C on a Brookfield cone and plate viscometer; the viscosity measurements are of a formulation containing 20.0g. of the epoxide blend of Example IA with 0.6g. of an aged catalyst solution prepared with 2 parts of the solvent and 1 part of p-methoxybenzenediazonium hexafluorophosphate; the cure rate is relative to the cure rate of a freshly prepared solution which exhibits a relative value of 1.0.

TABLE

| Solvent Added To Sulfolane (% of Total) | Initial Viscosity Cps. | Viscosity after 24 hrs., Cps. | Viscosity after 2 days Cps. | Relative Cure Rate | Initial Color |
|---|---|---|---|---|---|
| Toluene (2%) | 389 | 427 | 429 | 1.0 | light yellow |
| Xylene (2%) | 382 | 421 | 427 | 1.0 | " |
| Monochlorobenzene (2%) | 395 | 419 | 428 | 1.0 | " |
| Trichloroethylene (2%) | 380 | 411 | 427 | 0.98 | " |
| Methylene Chloride (2%) | 386 | 399 | 434 | 1.0 | " |
| Sucrose acetate isobutyrate (2%) | 396 | 411 | 446 | 1.0 | " |
| Propylene Carbonate (2%) | 389 | 402 | 444 | 0.98 | " |
| 3-methyl sulfolane (2%) | 386 | 409 | 442 | 1.0 | " |
| 2,4-dimethyl sulfolane (2%) | 395 | 414 | 444 | 1.0 | " |

TABLE-continued

| Solvent Added To Sulfolane (% of Total) | Initial Viscosity Cps. | Viscosity after 24 hrs., Cps. | Viscosity after 2 days Cps. | Relative Cure Rate | Initial Color |
|---|---|---|---|---|---|
| Water (3%) | 393 | 415 | 432 | 1.0 | '' |
| Anhydrous Sulfolane | 352 | 397 | 447 | 1.0 | '' |

It will be seen from the table that the addition of small percentages of inert solvents to sulfolane in no way diminishes its effectiveness as a solvent for use herein.

EXAMPLE 4

To compare the sulfone solvents of this invention with the corresponding sulfoxides which are known as gelation inhibitors or stabilizers for epoxy-diazonium systems, the following experiment is run:

0.2 (1%) gram of p-methoxybenzenediazoniumhexafluorophosphate was dissolved in 0.4 gram (2%) tetramethylene sulfoxide (2%) and the resultant solution was then stirred into 20 grams of the epoxy blend of Example 1. The diazonium catalyst was readily dissolved in the sulfoxide to produce a clear solution. Upon addition to the epoxy blend, the resulting mixture was a light yellow color, quite similar to compositions employing sulfolane of the present invention. For comparison, a similar solution was prepared except that sulfolane was substituted for the sulfoxide. The two samples were applied to paper-board and exposed to a 360 Watt UV-light source as in Example 1. The results were as follows:

| Formulation | Additive | Relative Cure Rate |
|---|---|---|
| 3A | Tetramethylene Sulfoxide (2%) | 0.0 |
| 3B | Sulfolane (2%) | 1.0 |

It will be apparent from the above experiment that the sulfloxide composition described above failed to give any semblance of cure when the coated paper-board substrate was stopped directly under the lamp and allowed to remain there for a period of time in excess of 1 minute.

Thus while sulfoxides are effective as inhibitors against premature gelation as disclosed in U.S. Pat. No. 3,711,391, such compounds have the effect of decreasing quite markedly the catalytic potential of the catalyst precursor and may poison the catalyst to the extent that substantial curing cannot occur in a reasonable length of time when amounts substantially above stabilizing amounts are employed.

It was therefore particularly unexpected to discover that generally the sulfone-catalyst solutions of the type described hereinabove may be stored for long periods of time and then utilized readily, in admixture as catalyzed formulations, for forming desired shapes, at any time during the entire period after mixing during which the viscosity remains within the practical limits for the desired forming or shaping operation; and further that activation of the latent catalyst precursor then can be effected by irradiation to release the Lewis acid catalyst without any noticeable interference due to the presence of the solvent.

While there have been described particular embodiments of the invention, including those at present considered to be the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A polymerizable composition, capable of being shipped and stored as a two-package system, consisting essentially of (1) a monomeric or prepolymeric epoxide material or mixture thereof with a monomer selected from the group consisting of lactones and vinyl-containing compounds, said material being polymerizable to higher molecular weights through the action of a cationic catalyst and (2) a radiation-sensitive aromatic diazonium salt of a complex halogenide, which decomposes upon application of energy to release a Lewis Acid effective to initiate polymerization of said epoxide material, dissolved in an organic sulfone, said organic sulfone being substantially inert to said diazonium salt and to said epoxide material.

2. The composition of claim 1, in which the monomeric or prepolymeric epoxide is a mixture of epoxides.

3. The composition of claim 1, in which the polymerizable material is a mixture of epoxides and a lactone.

4. The composition of claim 1, in which the polymerizable material is a mixture of epoxides and a vinylcontaining compound.

5. The composition of claim 1, in which said solvent is a tetrahydrothiophene-1,1-dioxide of the formula

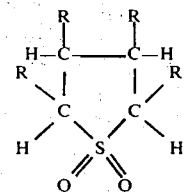

wherein R is selected from the group consisting of alkyl and hydrogen.

6. The composition of claim 1, in which said solvent is tetrahydrothiophene-1,1-dioxide.

7. The composition of claim 1, in which said solvent is dimethyltetrahydrothiophene-1,1-dioxide.

8. The composition of claim 1 in which said solvent is a mixture of tetrahydrothiophene-1,1-dioxide and dimethyltetrahydrothiophene-1,1-dioxide.

9. A polymerizable composition, capable of being shipped and stored as a two-package system, consisting essentially of, as one component, a liquid monomeric or prepolymeric epoxide material or mixture of epoxide materials with a monomer selected from the group consisting of gamma butyrolactone, styrene and dodecyl vinyl ether, said mixture being polymerizable to higher molecular weights through the action of a cationic catalyst and as a second component, an aromatic diazonium salt of a complex halogenide which decomposes upon application of energy to provide a halide Lewis acid effective to initiate polymerization of said epoxide material, dissolved in a tetrahydrothiophene-1,1-dioxide solvent, said solvent being substantially inert to said diazonium salt and to said epoxide material.

10. The composition of claim 9, in which the total amount of any unpolymerizable volatile solvents present in said composition is less than about 4% by weight of the liquid composition.

11. The composition of claim 10, in which the polymerizable material is a mixture of epoxides.

12. The composition of claim 9, in which the aromatic diazonium salt is 4-methoxybenzenediazoniumhexafluorophosphate.

13. The composition of claim 12, in which the solvent is tetrahydrothiophene-1,1-dioxide.

* * * * *